(12) United States Patent
Taguchi et al.

(10) Patent No.: US 12,286,543 B2
(45) Date of Patent: Apr. 29, 2025

(54) IMAGE FORMING METHOD

(71) Applicant: KONICA MINOLTA, INC., Tokyo (JP)

(72) Inventors: Yoshihito Taguchi, Kanagawa (JP); Masashi Ikeda, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 254 days.

(21) Appl. No.: 18/060,026

(22) Filed: Nov. 30, 2022

(65) Prior Publication Data

US 2023/0183507 A1 Jun. 15, 2023

(30) Foreign Application Priority Data

Dec. 9, 2021 (JP) .................................. 2021-199971

(51) Int. Cl.
| | |
|---|---|
| *C09D 11/38* | (2014.01) |
| *B01D 29/01* | (2006.01) |
| *B41J 2/175* | (2006.01) |
| *B41J 2/18* | (2006.01) |
| *C09D 11/326* | (2014.01) |

(52) U.S. Cl.
CPC .............. *C09D 11/38* (2013.01); *B01D 29/01* (2013.01); *B41J 2/17563* (2013.01); *B41J 2/18* (2013.01); *C09D 11/326* (2013.01)

(58) Field of Classification Search
CPC ........ B41J 2/17563; B41J 2/18; C09D 11/326
See application file for complete search history.

(56) References Cited

U.S. PATENT DOCUMENTS

| | | | |
|---|---|---|---|
| 11,618,255 B2* | 4/2023 | Shimizu | B41J 2/14274 347/47 |
| 2019/0016130 A1* | 1/2019 | Kawabe | C09D 11/322 |
| 2019/0218405 A1* | 7/2019 | Seguchi | C09D 11/033 |
| 2021/0071021 A1* | 3/2021 | Matsumoto | C09D 11/40 |
| 2022/0112390 A1* | 4/2022 | Kuriki | C09D 11/38 |

FOREIGN PATENT DOCUMENTS

| | | | | |
|---|---|---|---|---|
| JP | 2017186534 A | | 10/2017 | |
| WO | WO-2020137457 A1 | * | 7/2020 | ........... C09D 11/106 |
| WO | WO-2020218270 A1 | * | 10/2020 | ............... B05D 5/04 |

* cited by examiner

*Primary Examiner* — Sharon Polk
(74) *Attorney, Agent, or Firm* — Buchanan Ingersoll & Rooney PC

(57) ABSTRACT

An image forming method according to an aspect of the present invention includes supplying a water based ink to an inkjet head at a flow rate of 5 mL/min or more and 120 mL/min or less, and ejecting the supplied water based ink from a nozzle of the inkjet head. The water based ink contains a colorant and a water-insoluble resin having a glass transition temperature of 40° C. or higher and 100° C. or lower.

14 Claims, 4 Drawing Sheets

IMAGE FORMING METHOD

CROSS REFERENCE TO RELATED APPLICATIONS

The entire disclosure of Japanese Patent Application No. 2021-199971 filed on Dec. 9, 2021, is incorporated herein by reference in its entirety.

BACKGROUND

Technological Field

The present invention relates to an image forming method.

Description of Related Art

An inkjet method, which enables digital printing without using plates, can form images easily and inexpensively, and thus is used in various printing fields.

There are several types of inks used in an inkjet method, such as a water based ink composed of water and a small amount of organic solvent, a non-water based ink containing organic solvent but substantially no water, a hot-melt ink, which is solid at room temperature, to be heated and melted for printing, and an actinic radiation-curable ink that is cured by irradiation with actinic radiation after the ink is printed. These inks are used according to the application. Among these, water based inks generally have little odor and are highly safe.

Adding a resin to a water based ink is a known method for increasing the fixability (abrasion resistance) of an image formed from the water based ink. When a water based ink containing a resin is deposited on abase material and then the base material is heated or the ink thereon is dried, the resin forms a film, thereby obtaining an image with high fixability (abrasion resistance). Various methods are known as image forming methods using such an ink.

For example, Japanese Patent Application Laid-Open No. 2017-186534 discloses an inkjet printing method using an ink set. The ink set includes white ink and yellow ink each containing water, an organic solvent, a polysiloxane surfactant, and water-insoluble polyurethane resin particles. Japanese Patent Application Laid-Open No. 2017-186534 teaches that the presence of the polyurethane resin particles and the polysiloxane surfactant in the ink enables stabilizing of the surfactant in the ink, thereby preventing the phase separation of the ink and improving the storage stability. The literature also teaches that the abrasion resistance and solvent resistance can be improved by using Pigment Yellow 155 as the pigment in the yellow ink, and using the surfactant and the resin particles in combination.

Various image forming methods using a water based ink containing a water-insoluble resin are known as in Japanese Patent Application Laid-Open No. 2017-186534.

The present inventors have confirmed that the fixability of an image can be improved with an image forming method using a resin-containing water based ink, as disclosed in Japanese Patent Application Laid-Open No. 2017-186534. For using an image forming apparatus including a recirculating path or using a large-sized inkjet head, the increase in the flow rate of an ink supplied to the inkjet head may become necessary.

In the above case, using the water based ink containing a water-insoluble resin for forming an image as disclosed in Japanese Patent Application Laid-Open No. 2017-186534 increases the pressure in a channel through which ink passes over time, making it impossible to drive the apparatus steadily. Furthermore, the increase in the flow rate of the ink causes the reduction in the fixability of the image.

SUMMARY

The present invention has been made in view of the above situations. An object of the present invention is to provide an image forming method capable of preventing the increase in the pressure in a channel through which ink passes and also of improving the fixability of an image even when the flow rate of the ink supplied to an inkjet head is increased.

Solution to Problem

To achieve at least one of the abovementioned objects, according to an aspect of the present invention, an image forming method reflecting one aspect of the present invention includes: supplying a water based ink to an inkjet head at a flow rate of 5 mL/min or more and 120 mL/min or less; and ejecting, from a nozzle of the inkjet head, the water based ink supplied in the supplying, in which the water based ink contains a colorant and a water-insoluble resin having a glass transition temperature of 40° C. or higher and 100° C. or lower.

Advantageous Effects of Invention

The present invention can provide an image forming method capable of preventing the increase in the pressure in a channel through which ink passes and also of improving the fixability of an image even when the flow rate of the ink supplied to an inkjet head is increased.

BRIEF DESCRIPTION OF DRAWINGS

The advantageous and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1:
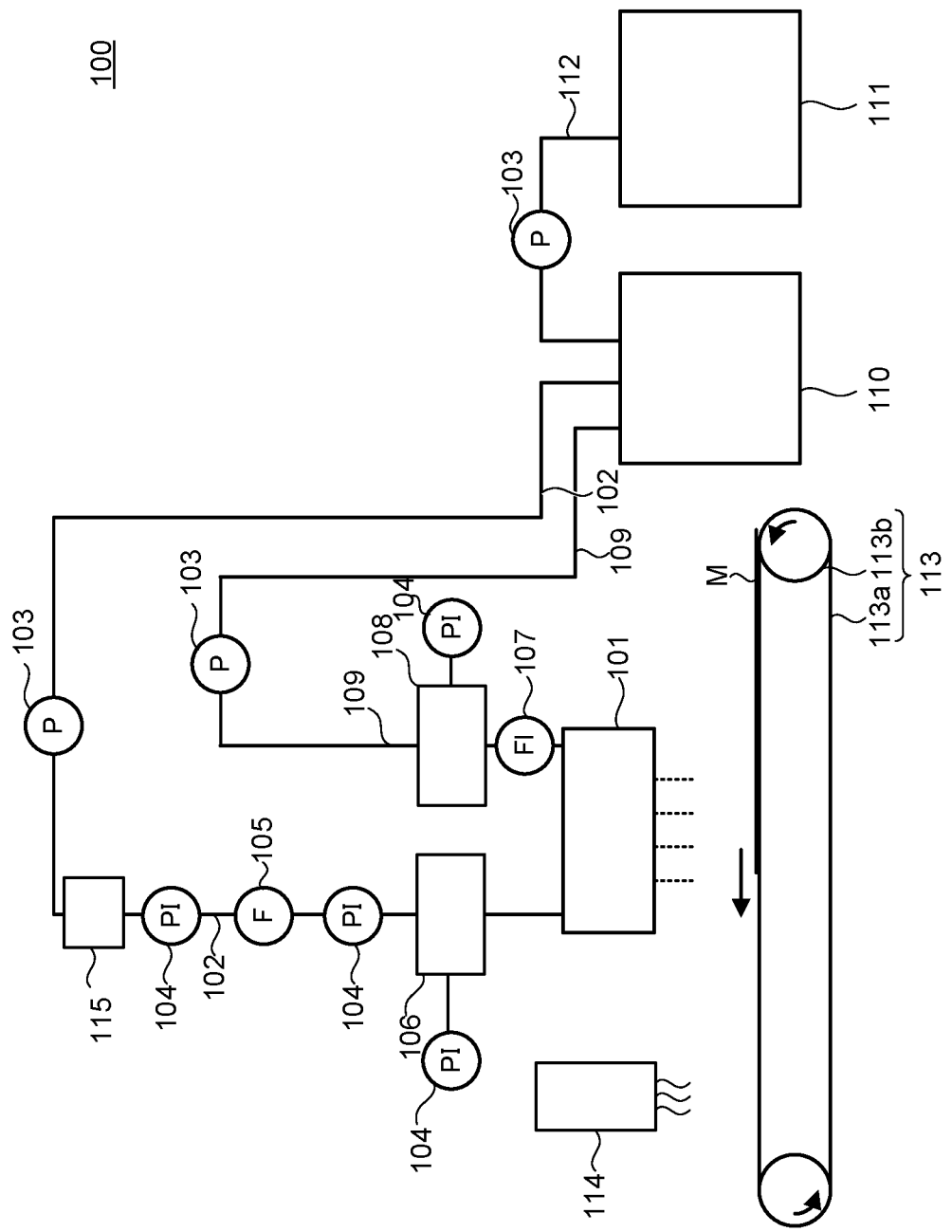
FIG. 1 schematically illustrates the configuration of an image forming apparatus that can be used for performing an image forming method according to an embodiment of the present invention.

Hereinafter, one or more embodiments of the present invention will be described with reference to the drawings. However, the scope of the invention is not limited to the disclosed embodiments.

For using an image forming apparatus including a recirculating path or using a large-sized inkjet head, the increase in the flow rate of an ink supplied to the inkjet head may become necessary, as described above.

In an image forming apparatus including a recirculating path, circulation is performed in such a way that ink that has not been ejected from an inkjet head is discharged from the inkjet head, and then the discharged ink is supplied to the inkjet head. This configuration can prevent the increase in ink viscosity near a nozzle—the increase may be caused by sedimentation or agglomeration of pigment particles and the like in the ink-, thereby increasing ejection stability. Such an image forming apparatus needs to supply ink to an inkjet head at an increased flow rate in view of the amount of ink ejected from the inkjet head in addition to the amount of ink discharged from the inkjet head.

In addition, an image forming apparatus including a large-sized inkjet head even without a recirculating path needs to eject a large amount of ink at once, thus needs to supply the ink to the inkjet head at an increased flow rate.

As described above, during the supplying of an ink containing a water-insoluble resin as described in Japanese Patent Application Laid-Open No. 2017-186534 to an inkjet head in an image forming apparatus, increasing the flow rate of the ink may increase the pressure in a channel through which ink passes over time. This may make the adjustment of the flow rate during ink ejection to a desired value difficult. In addition, regarding the ink described in Japanese Patent Application Laid-Open No. 2017-186534, the increase in the flow rate of the ink may cause the reduction in the fixability of the image. The reasons for the above problems are considered as follows.

When the flow rate of ink flowing through a narrow channel inside the inkjet head is increased, a frictional force is generated between the ink and the wall surface of the channel, and this frictional force generates a small amount of frictional heat. This small amount of frictional heat softens the water-insoluble resin contained in the ink, causing the softened resin to adhere to the wall surface of the channel. The resin adhering to the wall surface reduces the cross-sectional area of the channel overtime, resulting in an increase in pressure. The ink described in Japanese Patent Application Laid-Open No. 2017-186534 includes a resin whose glass transition temperature (Tg) is low; thus the ink is considered to be easily softened by the frictional heat when the flow rate is increased.

Furthermore, it is considered that the resin adhering to the wall surface of the channel reduces the amount of resin ejected from the inkjet head to be applied onto a recording medium, resulting in the reduction in the fixability.

As a result of extensive studies conducted by the present inventors, it has been found that the above problems can be solved by supplying an ink containing a water-insoluble resin having a glass transition temperature (Tg) of 40° C. or higher and 100° C. or lower to an inkjet head.

As the glass transition temperature (Tg) is 40° C. or higher, the resin is less likely to soften even when an increased amount of frictional heat is generated in the channel by the increase in the flow rate of the ink. The resin is therefore less likely to adhere to the wall surface of the channel. As a result, the pressure increase which may be caused by the reduction in the cross-sectional area of the channel over time can be prevented. In addition, as the resin is less likely to adhere to the wall surface, the reduction in the amount of resin in the ink to be applied to a recording medium can be prevented, thereby improving the fixability. As the glass transition temperature (Tg) is 100° C. or lower, the resin contained in the ink can appropriately soften after the ink is deposited on a recording medium to facilitate film formation, thereby improving the fixability.

In addition, the above-described ink is supplied to an inkjet head at a flow rate of 5 mL/min or more and 120 mL/min or less in the present invention. A flow rate of 5 mL/min or more of an ink supplied to an inkjet head causes the above described problems, namely the pressure increase in a channel through which the ink passes and the reduction in fixability. However, the present invention can solve the above problems by allowing the ink to contain a water-insoluble resin having a glass transition temperature within the above range.

A flow rate of 120 mL/min or less can prevent softening of the resin, which may be caused by excessive frictional heat generated by the flow of the ink through the narrow channel inside the inkjet head, thereby preventing the resin from adhering to the wall surface of the channel. As a result, the pressure increase in the ink channel over time, which may be caused by the reduction in the cross-sectional area of the channel over time, can be prevented.

1. Image Forming Apparatus

FIG. 1 schematically illustrates the configuration of image forming apparatus 100 that can be used for performing an image forming method according to an embodiment of the present invention.

Image forming apparatus 100 includes inkjet head 101, ink supply channel 102, liquid feed pumps 103, pressure sensors 104, filter 105, supply damper 106, flow meter 107, discharge damper 108, ink discharge channel 109, first tank 110, and second tank 111.

In image forming apparatus 100, ink housed in first tank 110 is supplied to inkjet head 101 through ink supply channel 102 by liquid feed pump 103. Ink that has not been ejected from inkjet head 101 is discharged to ink discharge channel 109 by liquid feed pump 103 and the discharged ink is returned to first tank 110. As a result, the ink, which has not been ejected from inkjet head 101, can be circulated from ink discharge channel 109 toward ink supply channel 102 and resupplied to inkjet head 101.

Circulating the ink in image forming apparatus 100 can prevent the increase in ink viscosity near a nozzle, which may be caused by sedimentation or agglomeration of pigment particles and the like in the ink, thereby increasing ejection stability.

The studies conducted by the present inventors have found that when filter 105 allowing the flow of an ink therethrough is installed in a channel through which the ink flows in image forming apparatus 100, the problems (namely the pressure increase in the channel, through which the ink flows, and the reduction in fixability) are more likely to occur. The reasons for the above problems are considered as follows.

As the ink passes through the filter, shearing heat is generated, which is increased as the ink flow rate is increased. This shearing heat softens the water-insoluble resin contained in the ink, and the softened resin adheres to the filter. The pressure of the ink in the channel thus increases due to the resin adhering to the filter. As the resin adheres to the filter, the amount of the resin contained in the ink applied to an recording medium is reduced, thereby reducing the fixability.

These problems can also be solved by using the ink containing a water-insoluble resin having a glass transition temperature of 40° C. or higher and 100° C. or lower. As the glass transition temperature is 40° C. or higher, the resin is less likely to soften—the softening may be caused by the shearing heat generated when the ink passes through the filter. The resin is therefore less likely to adhere to the filter. By preventing the softening of the resin, the occurrence of the pressure increase may be minimized regardless of the number of the filters installed (i.e., a single filter or a plurality of filters). It is also possible to prevent the reduction (which may occur as the resin passes through the filter) in the amount of resin in the ink to be applied to a recording medium, thereby improving the fixability.

As the glass transition temperature (Tg) is 100° C. or lower, the resin contained in the ink can appropriately soften after the ink is deposited on a recording medium to facilitate film formation, thereby improving the fixability.

In the present embodiment, image forming apparatus 100 includes filter 105 installed in ink supply channel 102 and filters 2c and 2d installed in inkjet head 101. Image forming apparatus 100 may include a plurality of filters in channels through which ink flows (such channels include a channel inside inkjet head 101) as in the present embodiment, or may include a filter in only one of ink supply channel 102 and inkjet head 101. The adhesion of the resin as described above may occur in any one of filters.

Materials for filters 105, 2c, and 2d are not limited, but are selected from, for example, metals such as stainless steel, copper, and nickel, and nonmetals such as polyethylene, Teflon, and polyvinylidene fluoride. In particular, from the viewpoint of the affinity, solubility, and durability with ink solvents, a material made of a metal such as stainless steel, copper, or nickel is preferred.

The mesh number (vertical×horizontal) of filters 105, 2c, and 2d is preferably 80×700 or more, preferably 150×1200 or more. As the mesh number is 80×700 or more, large-sized resin particles and the like contained in the ink are less likely to pass through the filter. The reduction in ejection stability due to nozzle clogging thus can be further prevented. On the other hand, the mesh number of 80×700 or more would cause the above described problems, namely the pressure increase in the channel and the reduction in fixability from the following reasons: the shearing heat is more likely to be generated when an ink passes through the filter, and a water-insoluble resin (described below) in the ink is more likely to soften. From the viewpoint of preventing filters 2c and 2d from excessively collecting the components in the ink, such as a pigment and a resin, the mesh number is preferably 510×3,600 or less. Herein, "mesh number" refers to the number of lines in one inch square of a filter.

Filters 105, 2c, and 2d may be the same or different from each other. In addition, filter 105 may be installed in ink discharge channel 109.

Inkjet head 101 includes a plurality of nozzles for ejecting ink droplets onto recording medium M such as a sheet of paper (namely, an object to be printed).

In the present embodiment, inkjet head 101 includes at least one filter disposed therein and a supplied ink passes through the filter, as described in detail below. More specifically, inkjet head 101 includes a filter through which ink discharged from inkjet head 101 without being ejected from inkjet head 101 passes, and a filter through which ink to be ejected from inkjet head 101 passes.

Examples of the inkjet head applicable to the inkjet method include inkjet heads in electro-mechanical conversion systems such as single cavity, double cavity, bender, piston, shear mode, and shared wall types; and in electro-thermal conversion systems such as thermal inkjet and bubble jet ("Bubble Jet" is a registered trademark of Canon, Inc.) types.

The inkjet head may be either a scan-type inkjet head or a line-type inkjet head, but the line-type inkjet head is preferred.

Figure 2:
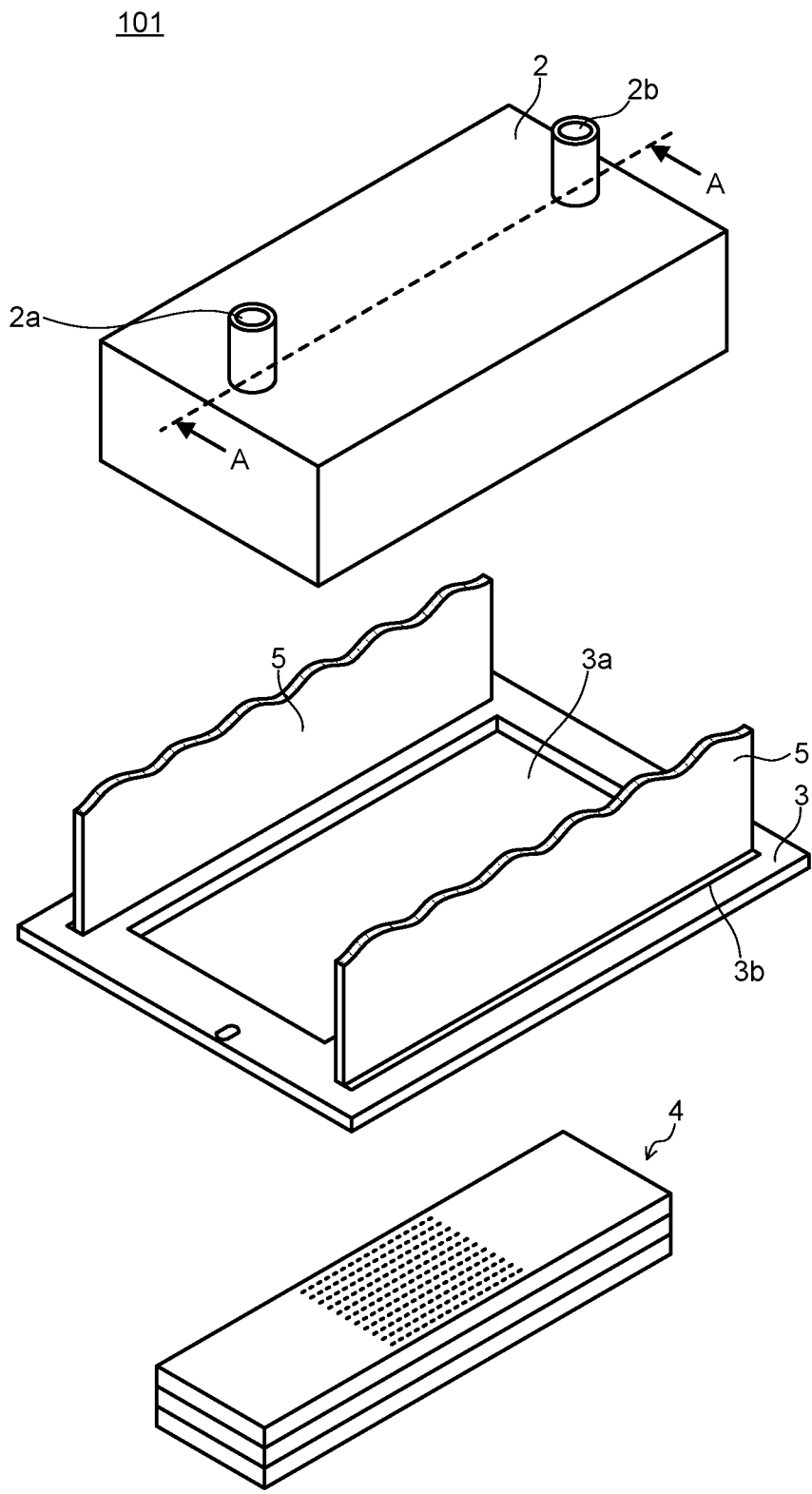
FIG. 2 is an exploded perspective view illustrating a schematic shape of an inkjet head applicable to the image forming apparatus according to an embodiment of the present invention.

FIG. 2 is an exploded perspective view illustrating a schematic shape of inkjet head 101 applicable to image forming apparatus 100. As illustrated in FIG. 2, inkjet head 101 includes common ink chamber 2, holding portion 3, head chip 4, and flexible wiring boards 5.

Figure 3:
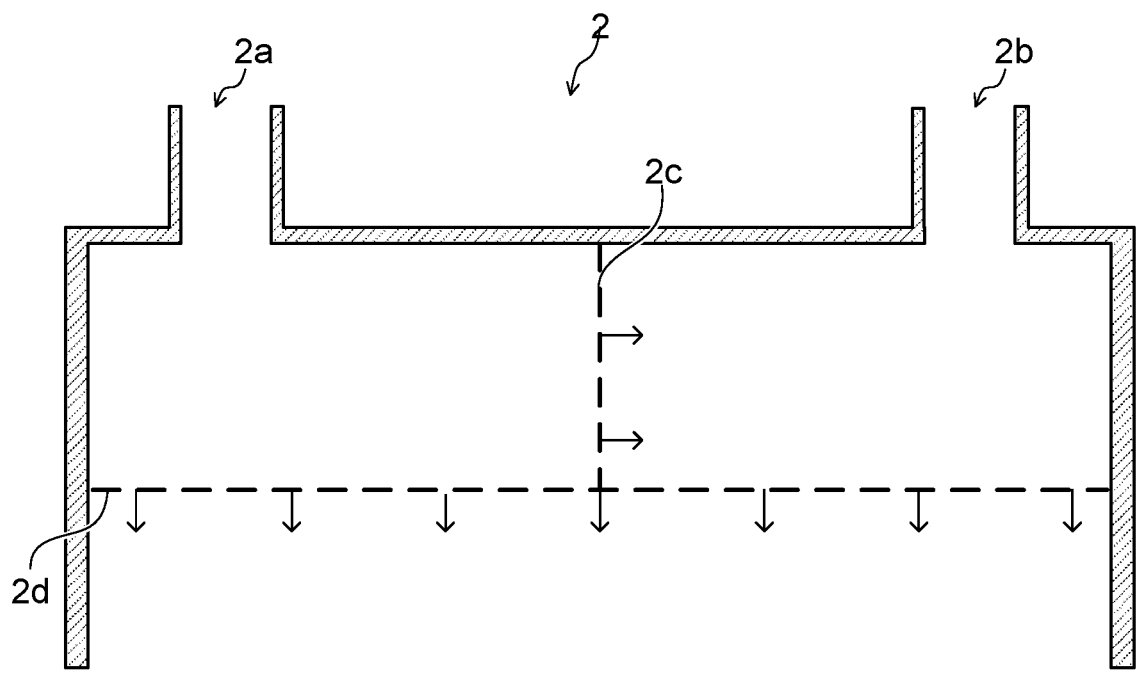
FIG. 3 is cross-sectional view of a common ink chamber taken along line A-A of FIG. 2.

FIG. 3 is cross-sectional view of common ink chamber 2 taken along line A-A of FIG. 2.

Common ink chamber 2 is formed in a hollow, substantially rectangular parallelepiped shape. In the common ink chamber, one surface facing holding portion 3 forms an opening. Common ink chamber 2 includes, on the surface opposite to the opening, ink supply port 2a for supplying ink and ink discharge port 2b for discharging, to the outside, ink not having been ejected from the inkjet head.

Common ink chamber 2 includes filters 2c and 2d in its inside. Filter 2c removes foreign matters from ink that is supplied from ink supply port 2a, is not ejected from inkjet head 101, and flows toward ink discharge port 2b. Filter 2d removes foreign matters from ink that is supplied from ink supply port 2a and flows toward an ejection port (for example, nozzle hole) of inkjet head 101.

Holding portion 3 is formed in a substantially flat plate shape with opening part 3a substantially in its center. Holding portion 3 is disposed so as to cover the opening of common ink chamber 2. That is, common ink chamber 2 is connected to one surface of holding portion 3 so as to cover opening part 3a. Head chip 4 is connected to the other surface of holding portion 3 so as to cover opening part 3a. Holding portion 3 allows common ink chamber 2 and head chip 4 to communicate with each other through opening part 3a.

Insertion holes 3b are provided in the outer peripheral part of holding portion 3. Flexible wiring board 5 is inserted through insertion hole 3b. One end of flexible wiring board 5 is connected to a wiring board of head chip 4. The other end of flexible wiring board 5 is inserted through insertion hole 3b (provided in holding portion 3) from the other surface of holding portion 3 and is pulled out to the common ink chamber 2 side.

Ink supply channel 102 is configured to supply ink to inkjet head 101 by liquid feed pump 103. Ink discharge channel 109 is configured to discharge the ink not having been ejected from inkjet head 101 from ink discharge port 2b of inkjet head 101.

Liquid feed pumps 103 are respectively disposed in ink supply channel 102, ink discharge channel 109, and ink replenishment channel 112. Liquid feed pumps 103 sends the ink in first tank 110 to inkjet head 101 and sends the ink discharged from inkjet head 101 into first tank 110 as described above. Liquid feed pump 103 disposed in ink replenishment channel 112 sends the ink in second tank 111 to first tank 110.

Pressure sensor 104 is a device for measuring the pressure value inside a channel. In the present embodiment, plurality of pressure sensors 104 are installed in ink supply channel 102. Reading the numerical values of pressure sensors 104 can determine whether or not the pressure is increased in the channel between pressure sensors 104 from the difference between the measured pressure values.

Supply damper 106 is disposed in ink supply channel 102 and configured to store the ink to be sent to inkjet head 101. Supply damper 106 can prevent the occurrence of pulsation in ink supply channel 102.

Discharge damper 108 is disposed in ink discharge channel 109 and configured to store the ink discharged from inkjet head 101. Discharge damper 108 can prevent the occurrence of pulsation in ink discharge channel 109.

Supply damper 106 and discharge damper 108 are each provided with pressure sensor 104. The pressure changes in supply damper 106 and discharge damper 108 can be measured with pressure sensors 104.

Flow meter 107 is installed in ink discharge channel 109 and measures the flow rate of ink flowing through the channel. Flow meter 107 may be installed in ink supply channel 102.

First tank 110 is configured to house ink to be supplied to inkjet head 101 and ink discharged from inkjet head 101 without being ejected. Second tank 111 is configured to house ink to be supplied to first tank 110 when the amount of the ink stored in first tank 110 is lowered. In the present embodiment, liquid feed pump 103 supplies the ink from second tank 111 to first tank 110 through ink replenishment channel 112.

First tank 110 and second tank 111 may include a stirring device (not illustrated). The configurations of first tank 110 and second tank 111 can be appropriately determined according to, for example, the image forming performance and size of image forming apparatus 100.

Transport device 113 is configured to transport recording medium M. Transport device 113 includes, for example, belt conveyor 113a and rotatable feed rollers 113b.

In the present embodiment, image forming apparatus 100 may include dryer 114. Dryer 114 is configured to dry the ink applied on recording medium M. Any dryer, such as a known heater or an irradiator that emits light from an infrared lamp, can be used as dryer 114.

Image forming apparatus 100 may further include degassing module 115. In the present embodiment, degassing module 115 is disposed in ink supply channel 102. Degassing module 115 can remove air bubbles contained in the ink flowing through ink supply channel 102 by degassing.

In the present embodiment, image forming apparatus 100 may have a configuration in which ink is not circulated. For example, image forming apparatus 100 may have a configuration in which ink discharge channel 109 is removed from inkjet head 101 and ink discharge port 2b is covered with a lid.

1-2. Water Based Ink

The ink applicable to the image forming method in the present embodiment contains water, a colorant, and at least one water-insoluble resin having a glass transition temperature of 40° C. or higher and 100° C. or lower.

Water

The water based ink contains water in the present embodiment. The type of water contained in the water based ink is not limited. The content of water in the water based ink is preferably 50 mass % or more based on the total mass of the ink. More preferably, the water content is 60 mass % or more based on the total mass of liquid components in the ink.

Colorant

The water based ink contains a colorant in the present embodiment.

The colorant contained in the water based ink is not limited, and is, for example, a dye or a pigment. From the viewpoint of increasing the water resistance and light resistance of formed images, the colorant is preferably a pigment.

Examples of the dye includes yellow dyes, magenta dyes, cyan dyes, and black dyes.

Examples of the yellow dyes include C.I. Acid Yellow 7:1, 17, 19, 23, 25, 29, 38, 42, 49, 61, 72, 78, 110, 127, 135, 141, and 142 (all manufactured by Tokyo Chemical Industry Co., Ltd.).

Examples of the magenta dyes include C.I. Acid Red 8, 9, 14, 18, 26, 27, 35, 37, 51, 57, 82, 87, 92, 94, 111, 129, 131, 138, 186, 249, 254, 265, and 276 (all manufactured by Tokyo Chemical Industry Co., Ltd.).

Examples of the cyan dyes include C.I. Acid Blue 1, 7, 9, 15, 22, 23, 25, 40, 41, 43, 62, 78, 83, 90, 93, 103, 112, 113, and 158 (all manufactured by Tokyo Chemical Industry Co., Ltd.).

Examples of the black dyes include C.I. Acid Black 1, 2, 24, 26, 31, 52, 107, 109, 110, 119, and 154 (all manufactured by Tokyo Chemical Industry Co., Ltd.).

Examples of the pigment includes yellow pigments, magenta pigments, cyan pigments, black pigments, and white pigments.

Examples of yellow pigments include C.I. Pigment Yellow 12, C.I. Pigment Yellow 13, 14, 15, 15:3, 17, 74, 93, 128, 94, 138, and 155 (all manufactured by Tokyo Chemical Industry Co., Ltd.).

Examples of the magenta pigment include C.I. Pigment Red 2, C.I. Pigment Red 3, 5, 6, 7, 15, 16, 48; 1, 53; 1, 57; 1, 122, 123, 139, 144, 149, 150, 166, 177, 178, 184, 222, and 238.

Examples of the cyan pigment include C.I. Pigment Blue 15, 15; 2, 15; 3, 15; 4, 16, 60, 62, and 66 (all manufactured by Tokyo Chemical Industry Co., Ltd.).

Examples of the black pigment include carbon black, and C.I. Pigment Black 7, 26, and 28.

Examples of the white pigments include inorganic pigments and organic pigments. Examples of the inorganic pigments include heavy calcium carbonate, light calcium carbonate, titanium oxide, aluminum hydroxide, titanium white, talc, calcium sulfate, barium sulfate, zinc oxide, magnesium oxide, magnesium carbonate, amorphous silica, colloidal silica, white carbon, kaolin, calcined kaolin, delaminated kaolin, aluminosilicate, sericite, bentonite, and smectite. Examples of the organic pigments include polystyrene resin particles and urea formalin resin particles.

A water based ink containing a pigment preferably contains a pigment dispersant. The content of the pigment dispersant is not limited, but is preferably 5 mass % or more and 60 mass % or less, more preferably 15 mass % or more and 45 mass % or less, based on the total mass of the pigment.

Any pigment dispersant may be used, and examples thereof include low molecular weight dispersants and high molecular weight dispersants. It is preferable to use a high molecular weight dispersant for more stable dispersing of the pigment is possible due to its steric repulsion effect. Herein, "high molecular weight dispersant" refers to a pigment dispersant having a weight average molecular weight of 1,000 or more and 200,000 or less. Weight average molecular weight (Mw) can be determined by gel permeation chromatography using polymethyl methacrylate as a reference standard.

The resin constituting the high molecular weight dispersant may be a homopolymer of a hydrophilic monomer, a copolymer of hydrophilic monomers, or a copolymer of a hydrophilic monomer and a hydrophobic monomer. Herein, "hydrophilic monomer" refers to a monomer having a solubility of 1 g or more in 100 ml of water at 25° C., and "hydrophobic monomer" refers to a monomer having a solubility of 1 g or less in 100 ml of water at 25° C.

Examples of the hydrophilic monomer include monomers each containing a carboxyl group or an acid anhydride group (for example, unsaturated polycarboxylic acids such as (meth)acrylic acid and maleic acid, and maleic anhydride); and monomers of ethylene oxide-modified (meth)acrylate (such as ethylene oxide-modified (meth)acrylic acid alkyl esters).

Examples of the hydrophobic monomer include monomers of (meth)acrylate such as methyl (meth)acrylate and ethyl (meth)acrylate; monomers of propylene oxide-modified (meth) acrylate; (meth) acrylate monomers having an alkyl group having 3 to 6 carbon atoms in the side chain thereof; monomers of styrenes such as styrene, α-methylstyrene, and vinyltoluene; monomers of α-olefins such as ethylene, propylene, and 1-butene; and monomers of carboxylic acid vinyl esters such as vinyl acetate and vinyl butyrate.

Examples of the copolymers include styrene-acrylic acid copolymer, styrene-acrylic acid-alkyl acrylate copolymer, styrene-maleic acid copolymer, styrene-maleic acid-alkyl acrylate copolymer, styrene-methacrylic acid copolymer, styrene-methacrylic acid-alkyl acrylate copolymer, and styrene-maleic acid half ester copolymer.

The copolymer may be any one of random copolymers, alternating copolymers, block copolymers, comb copolymers, and comb block copolymers. From the viewpoint of further increasing the dispersibility of the pigment, the copolymer is preferably a comb block copolymer.

A comb block copolymer is defined as a copolymer containing a linear polymer constituting the main chain of the copolymer and another type of polymer graft-polymerized to a structural unit derived from a monomer constituting the main chain.

Examples of commercially available pigment dispersants include DISPERBYK-182, DISPERBYK-184, DISPERBYK-190, DISPERBYK-194, DISPERBYK-2164, DISPERBYK-168, and DISPERBYK N22024 (all manufactured by BYK).

The particle diameter of the pigment particles is not limited, but from the viewpoint of dispersing the pigment in the ink for a long period of time, the volume-based median diameter of the pigment particles is preferably 50 nm or more and 200 nm or less. The particle diameter can be determined with a known particle diameter measuring instrument using a dynamic light scattering method or an electrophoresis method. Measurement by the dynamic light scattering method is preferred from the viewpoint of simple and highly accurate measurement.

The content of the colorant (except the white pigment) contained in the ink is not limited, but is preferably 2 mass % or more and 15 mass % or less, more preferably 4 mass % or more and 12 mass % or less, based on the total mass of the ink. A content of 2 mass % or more can improve color reproducibility of images formed from the ink, and a content of 15 mass % or less can further increase dispersion stability of the colorant in the ink.

When the ink contains a white pigment as the colorant, the content of the white pigment is preferably 4 mass % or more and 15 mass % or less based on the total mass of the ink.

Water-Insoluble Resin

In the present embodiment, the water based ink contains a water-insoluble resin having a glass transition temperature (Tg) of 40° C. or higher and 100° C. or lower.

Herein, "water-insoluble resin" refers to a resin having a solubility of 0.1 g or less in water of pH 7 at a temperature of 25° C.

As the glass transition temperature (Tg) of water-insoluble resin is 40° C. or higher, the resin is less likely to soften even when an increased amount of frictional heat is generated in a channel by the increase in the flow rate of the ink, as described above. The resin is therefore less likely to adhere to the wall surface of the channel. As a result, the pressure increase, which may be caused by the reduction in the cross-sectional area of the channel over time, can be prevented. In addition, as the resin is less likely to adhere to the wall surface, the reduction in the amount of resin in the ink to be applied to a recording medium can be prevented, thereby improving the fixability. As the glass transition temperature (Tg) is 100° C. or lower, the resin contained in the ink can appropriately soften after the ink is deposited on a recording medium to facilitate film formation, thereby improving the fixability. From the above viewpoints, the glass transition temperature (Tg) of the water-insoluble resin contained in the ink is preferably 60° C. or higher and 90° C. or lower, and more preferably 70° C. or higher and 80° C. or lower.

The glass transition temperature (Tg) can be measured with a differential scanning calorimeter "Diamond DSC" (manufactured by PerkinElmer) under the following heating and cooling conditions: a temperature heating/cooling rate of 10° C./min and a temperature elevation range of 0° C. to 150° C.

The water-insoluble resin of the present embodiment may be of any type, so long as the water-insoluble resin has a glass transition temperature (Tg) of 40° C. or higher and 100° C. or lower. Examples of the water-insoluble resin include acrylic resins, vinyl chloride-acrylic resins, polyester resins, styrene acrylic resins, and polyurethane resins. In particular, from the viewpoint of water resistance and environmental adaptability of the film-forming material, acrylic resins, polyester resins, and styrene-acrylic resins are preferred.

In the present embodiment, the water-insoluble resin may be dispersed as emulsion. In this case, the particle diameter of the emulsion is preferably 500 nm or less from the viewpoint of improving ejection properties from the inkjet head. In addition, the particle diameter is preferably 10 nm or more, from the viewpoint of increasing the volume of the resin to improve the fixability. The particle diameter can be measured, for example, with a particle size distribution analyzer (Zetasizer 1000HS, manufactured by Malvern Panalytical).

The content of the water-insoluble resin is preferably 1 mass % or more and 10 mass % or less, more preferably 2 mass % or more and 8 mass % or less, and even more preferably 3 mass % or more and 6 mass % or less, based on the total mass of the water based ink. A content of 1 mass % or more allows the ink to increase the amount of film formation after the ink is deposited on a recording medium, thereby satisfactorily improving fixability. A content of 10 mass % or less can prevent the increase in viscosity of the ink, thereby further increasing the ejection stability of the ink.

For using a pigment as a colorant in the ink, the ratio (PB ratio) of the content (mass) of the pigment to the content of the water-insoluble resin is preferably 0.3 or more and 2.0 or less, more preferably 0.5 or more and 1.5 or less. A ratio of 0.3 or more can improve color reproducibility of images formed from the ink, and a ratio of 2.0 or less can further improve fixability by satisfactorily reducing the amount of excessive pigment the resin cannot fix.

The SP value of the water-insoluble resin is preferably 15 $(MPa)^{1/2}$ or more and 25 $(MPa)^{1/2}$ or less, more preferably 16 $(MPa)^{1/2}$ or more and 24 $(MPa)^{1/2}$ or less. As the SP value of the water-insoluble resin is within the above range, the difference in SP value between the water-insoluble resin and a water-soluble organic solvent (described below) can be easily adjusted to a preferable range, thereby further improving the fixability.

Water-Soluble Organic Solvent

In the present embodiment, the water based ink may contain at least one type of organic solvent. The type of organic solvent is not limited, but is preferably a water-soluble organic solvent from the viewpoint of increasing compatibility with water. Herein, "water-soluble organic solvent" refers to an organic solvent having a solubility of 10 g or more in water at 25° C.

Examples of the water-soluble organic solvent include alcohols, polyhydric alcohols, amines, amides, and glycol ethers. Only one type of these solvents may be contained, or two or more types may be contained in combination.

Examples of the alcohols include methanol, ethanol, propanol, isopropanol, butanol, and isobutanol.

Examples of the polyhydric alcohols include ethylene glycol, diethylene glycol, triethylene glycol, tetraethylene glycol, polyethylene glycol having 5 or more ethylene oxide groups, propylene glycol, dipropylene glycol, and tripropylene glycol.

Examples of the amines include ethanolamine, diethanolamine, triethanolamine, N-methyldiethanolamine, N-ethyldiethanolamine, morpholine, N-ethylmorpholine, ethylenediamine, diethylenediamine, triethylenetetramine, tetraethylenepentamine, polyethyleneimine, pentamethyldiethylenetriamine, and tetramethylpropylenediamine.

Examples of the amides include formamide, N,N-dimethylformamide, and N,N-dimethylacetamide.

The water-soluble organic solvent contained in the water based ink preferably includes an organic solvent having an SP value of 16 $(MPa)^{1/2}$ or more and 28 $(MPa)^{1/2}$ or less, more preferably includes an organic solvent having an SP value of 18 $(MPa)^{1/2}$ or more and 26 $(MPa)^{1/2}$ or less.

An SP value of an organic solvent within the above range is fairly close to the SP value (approximately 15 to 25 $MPa^{1/2}$) of the resin contained in the water based ink. The organic solvent having such a SP value thus has high compatibility with the resin. After an ink containing such an organic solvent is deposited on a recording medium, the proportion of the organic solvent in the ink increases as the water evaporates. On this occasion, the resin contained in the ink and the organic solvent are more likely to become partially compatible. Appropriate softening of the surface of the resin particles facilitates fusion between the resins, thereby allowing the resin to form a film on the recording medium and improving fixability.

When the ink contains a water-soluble organic solvent having an SP value within the above range and a water-insoluble resin having a glass transition temperature (Tg) of 40° C. or higher and 100° C. or lower, more remarkably improved fixability can be obtained. For further improving the fixability, a certain amount of heat may be required to fuse a resin having a high glass transition temperature on a recording medium to form a film. However, the above-described water-soluble organic solvent facilitates resin fusion and film formation as described above. Therefore, using a water-soluble organic solvent having an SP value within the above range for the ink of the present embodiment is more effective in improving fixability.

Examples of the water-soluble organic solvents having an SP value of 16 $(MPa)^{1/2}$ or more and 28 $(MPa)^{1/2}$ or less include 1,2-butanediol (SP value of 27.8 $(MPa)^{1/2}$), 1,3-butanediol (SP value of 29.1 $(MPa)^{1/2}$), 3-methyl-1,3-butanediol (SP value of 26.2 $(MPa)^{1/2}$), 1,2-pentanediol (SP value of 26.0 $(MPa)^{1/2}$), 1,5-pentanediol (SP value of 26.7 $(MPa)^{1/2}$), 2-methyl-2,4-pentanediol (SP value of 25.2 $(MPa)^{1/2}$), 1,2-hexanediol (SP value of 24.7 $(MPa)^{1/2}$), 1,6-hexanediol (SP value of 25.5 $(MPa)^{1/2}$), tripropylene glycol (SP value of 22.6 $(MPa)^{1/2}$), diethylene glycol monoethyl ether (SP value of 21.8 $(MPa)^{1/2}$), diethylene glycol monobutyl ether (SP value of 20.6 $(MPa)^{1/2}$), triethylene glycol monobutyl ether (SP value of 21.2 $(MPa)^{1/2}$), triethylene glycol monobutyl ether (SP value of 20.2 $(MPa)^{1/2}$), dipropylene glycol monomethyl ether (SP value of 19.4 $(MPa)^{1/2}$), tripropylene glycol monomethyl ether (SP value of 19.6 $(MPa)^{1/2}$), dipropylene glycol dimethyl ether (SP value of 18.3 $(MPa)^{1/2}$), and dipropylene glycol propyl ether (SP value of 18.6 $(MPa)^{1/2}$).

In the present embodiment, the SP value of the entire organic solvent contained in the ink is preferably 16 $(MPa)^{1/2}$ or more and 30 $(MPa)^{1/2}$ or less, more preferably 18 $(MPa)^{1/2}$ or more and 30 $(MPa)^{1/2}$ or less, and even more preferably 18 $(MPa)^{1/2}$ or more and 27 $(MPa)^{1/2}$ or less. After the ink is deposited on a recording medium, the SP value of the ink gradually approaches the SP value of the organic solvent contained in the ink as the water contained in the ink evaporates. At this time, the following can be considered: when the ink contains an organic solvent having an SP value within the above range, the SP value of the ink is more likely to approach the above range and also the SP value of the resin during the water evaporation; thus the surface of the resin particles can be appropriately dissolved (softened) to improve the fixability. In the present embodiment, the SP value of the entire organic solvent can be obtained by adding the products of the respective SP values and volumes of organic solvents and dividing the sum by the volume of the entire organic solvent.

The difference between the SP value of the water-soluble organic solvent and the SP value of the water-insoluble resin is preferably not too small. The SP value difference being not too small and within an appropriate range can further prevent the SP value before the ejection from the inkjet head (i.e., the SP value of the ink in a channel) from becoming too close to the SP value of the resin. As a result, excessive softening of the resin in the channel and adhesion of the resin to the wall surface of the channel can be further prevented.

From such a viewpoint, the minimum value of the differences between the SP value(s) of the at least one water-soluble organic solvent and the SP value(s) of the at least one water-insoluble resin is preferably 2 $(MPa)^{1/2}$ or more and 11 $(MPa)^{1/2}$ or less, more preferably 2 $(MPa)^{1/2}$ or more and 9 $(MPa)^{1/2}$ or less. When the minimum value of the SP value differences is 2 $(MPa)^{1/2}$ or more, the SP value of the ink before being ejected from the inkjet head is not too close to the SP value of the resin, thereby satisfactorily preventing excessive softening of the resin. As a result, adhesion of the resin contained in the ink in a channel to the wall surface of the channel can be satisfactorily prevented.

Further, when the SP value difference is 11 $(MPa)^{1/2}$ or less, the SP value of the ink after depositing the ink on a recording medium (after the water of the ink evaporates) approaches the SP value of the resin. The improving effect of the fixability obtained by the softening of the resin particles thus becomes more remarkable.

In addition, the minimum value of the differences between the SP value(s) of the entire organic solvent and the SP value(s) of the at least one water-insoluble resin is preferably 2 $(MPa)^{1/2}$ or more and 11 $(MPa)^{1/2}$ or less, more preferably 2 $(MPa)^{1/2}$ or more and 9 $(MPa)^{1/2}$ or less.

The content of the organic solvent is preferably 1 mass % or more and 40 mass % or less, more preferably 2 mass % or more and 30 mass % or less, and even more preferably 3 mass % or more and 20 mass % or less, based on the total mass of the water based ink. A content of 1 mass % or more can improve the wettability of the ink to a recording medium to allow the ink to be easily spread out, thereby improving the color developing property of the ink. A content of 40 mass % or less can prevent the increase in ink viscosity to improve the ejection stability of the ink.

The content of the organic solvent having an SP value of 16 $(MPa)^{1/2}$ or more and 28 $(MPa)^{1/2}$ or less in the entire organic solvent is preferably 1 mass % or more and 40 mass % or less, more preferably 2 mass % or more and 30 mass % or less, and even more preferably 3 mass % or more and 20 mass % or less, based on the total mass of the ink. When the content of the organic solvent whose SP value is within the above range is 1 mass % or more, the resin contained in the ink can appropriately soften after the ink is deposited on a recording medium to facilitate film formation, thereby further improving the fixability. When the content of the organic solvent whose SP value is within the above range is 40 mass % or less, the SP value of the ink before the water evaporates (i.e., before the ink is deposited on a recording medium) approaches the above range. The dissolution of the surface of the resin thus can be satisfactorily prevented. As a result, excessive softening of the resin contained in the ink in the inkjet head and adhesion of the resin to the wall surface of a channel can be further prevented.

The proportion of the content of the organic solvent having an SP value of 16 $(MPa)^{1/2}$ or more and 28 $(MPa)^{1/2}$ or less in the entire organic solvent contained in the ink is preferably 55 mass % or more and 100 mass % or less, more preferably 70 mass % or more and 100 mass % or less. A proportion of 55 mass % or more can appropriately soften the resin contained in the ink after the ink is deposited on a recording medium to facilitate film formation, thereby further improving the fixability.

Additional Components

In the present embodiment, the ink may contain a surfactant, a pH adjuster, an ultraviolet absorber, fine oil droplets, a fluorescent brightener, polysaccharide, a viscosity modifier, a resistivity modifier, a film-forming agent, an antioxidant, an antifungal agent, and/or a rust inhibitor according to the purpose. Only one type of these components may be contained, or two or more types may be contained in combination.

Examples of the surfactant include anionic surfactants such as dialkyl sulfosuccinates, alkylnaphthalene sulfonates, and fatty acid salts; nonionic surfactants such as polyoxyethylene alkyl ethers, polyoxyethylene alkylallyl ethers, acetylene glycols, and polyoxyethylene-polyoxypropylene block copolymers; cationic surfactants such as alkylamine salts and quaternary ammonium salts; silicone surfactants; and fluorinated surfactants.

Examples of the pH adjuster include known acids, bases and buffers. In particular, ammonia, monomethylamine, dimethylamine, trimethylamine, monoethylamine, diethylamine, triethylamine, methylethylamine, monoethanolamine, diethanolamine, triethanolamine, ethylenediamine, methylaminoethanol, and dimethylaminoethanol, and salts thereof are preferred as they are less likely to inhibit the reaction between a cross-linkable resin and a cross-linker.

Examples of the ultraviolet absorber include benzophenone ultraviolet absorbers, benzotriazole ultraviolet absorbers, benzoate ultraviolet absorbers, and triazine ultraviolet absorbers.

Physical Properties

From the viewpoint of increasing the ejection stability of the ink from the nozzles of the inkjet head, the ink preferably has a viscosity of 1 cP or more and less than 100 cP. From the viewpoint of further increasing the ejection stability, the viscosity of the ink is more preferably 1 cP or more and 50 cP or less, and further preferably 1 cP or more and 15 cP or less.

In the present embodiment, the ink preferably has a viscosity change rate of 5% or less between before and after the procedure of passing 100 L of the ink through the filter. Herein, "viscosity change rate" is defined as the ratio of the difference in viscosity between before and after the procedure below with respect to the viscosity of the ink before the procedure. In the procedure, an ink is passed through a twill weave stainless steel filter with a mesh number of 325×2300, a vertical wire diameter of 35 μm, and a horizontal wire diameter of 25 μm at a flow rate of 20 mL/min.

The more the resin contained in an ink clogs a filter, the lower the solid content concentration in the ink after the ink passes through the filter, and the lower the viscosity. That means, the smaller the change in viscosity between before and after the ink passes through the filter, the smaller the change in the solid content concentration of the ink, and the smaller the amount of resin that adheres to the filter. From such a viewpoint, the viscosity change rate is preferably 5% or less, more preferably 2% or less.

The viscosity change rate can be obtained, for example, as follows: measuring the viscosity of the ink before being put into first tank 110 and the viscosity of the ink remaining in the first tank after 100 L of ink passes through a filter by using an E-type viscometer (TP-200E, from Toki Sangyo Co., Ltd). At this time, ink is not supplied from second tank 111 to first tank 110 during the procedure of passing 100 L of the ink through the filter. Whether 100 L of ink has passed through the filter can be determined from the flow rate of the ink and the time during which the ink is passed.

From the viewpoint of increasing the ejection stability of the ink from the nozzles of the inkjet head, the surface tension of the ink is preferably 20 mN/m or more and 50 mN/m or less. From the viewpoint of increasing the wettability with respect to a recording medium to obtain a high-definition image, the surface tension of the ink is more preferably 20 mN/m or more and 35 mN/m or less. The surface tension of the ink can be adjusted to fall within the above range by changing at least one of the types and amounts of the surfactant and organic solvent.

1-3. Image Forming Method

Figure 4:
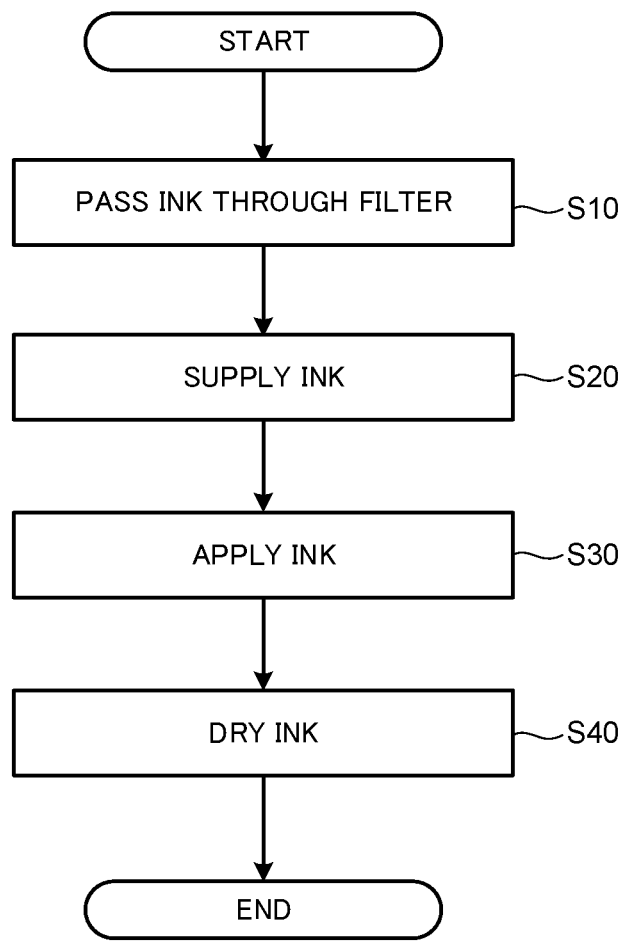
FIG. 4 is a flowchart of the image forming method according to the embodiment of the present invention.

FIG. 4 is a flowchart of the image forming method according to the present embodiment.

As illustrated in FIG. 4, the image forming method according to the present embodiment includes a step of supplying a water based ink to an inkjet head at a flow rate of 5 mL/min or more and 120 mL/min or less (step S20), and a step of ejecting the water based ink from the nozzles of the inkjet head (step S30). In the present embodiment, image forming apparatus 100 is used to perform the image forming method.

Step of Passing Water Based Ink Through Filter (Step S10)

The image forming method according to the present embodiment may include a step of passing the water based ink through a filter.

In the present embodiment, the water based ink is passed through filter 105 installed in the ink supply channel 102, and the passed water based ink is supplied to inkjet head 101 in step S20.

As described above, passing a water based ink through a filter is more likely to cause pressure increase due to clogging of the filter. However, using the above-described water based ink can prevent the pressure increase due to clogging of the filter.

In the present embodiment, the present step is performed before the step of supplying the water based ink to the inkjet head (step S20), but is not limited thereto. For example, the present step may be performed between the step of supplying the water based ink to the inkjet head (step S20) and the step of ejecting the ink (step S30). In this case, the water based ink is passed through a filter installed inside inkjet head 101. Alternatively, for example, the present step may be performed after the step of discharging the water based ink from the inkjet head (step S50). In this case, the water based ink is passed through a filter installed in ink discharge channel 109.

Step of Supplying Water Based Ink to Inkjet Head (Step S20)

In the present step, the above-described water based ink is supplied to inkjet head 101 at a flow rate of 5 mL/min or more and 120 mL/min or less.

In the present embodiment, the water based ink housed in first tank 110 is supplied to inkjet head 101 through ink supply channel 102 by liquid feed pump 103. Liquid feed pump 103 can adjust the flow rate of the ink supplied to inkjet head 101.

The flow rate of the water based ink supplied to inkjet head 101 is 5 mL/min or more and 120 mL/min or less, but preferably 7 mL/min or more and 100 mL/min or less and more preferably 10 mL/min or more and 80 mL/min or less. The flow rate being 7 mL/min or more can increase the flow rate of the ink supplied to inkjet head 101 and prevent drying of the nozzles. On the other hand, the above described problems, namely the pressure increase in the channel and the reduction in fixability, are more likely to occur. The flow rate being 10 mL/min or more can further increase the flow rate of the ink, but the pressure increase in the channel and the reduction in fixability are further likely to occur. In the present embodiment, these problems can be solved by using the ink containing a water-insoluble resin having a glass transition temperature of 40° C. or higher and 100° C. or lower.

The flow rate being 100 mL/min or less can further prevent softening of the resin contained in the ink, which may be caused by excessive shearing heat generated in the channel, thereby further preventing adhesion of the resin to the wall surface of the channel. The flow rate being 80 mL/min or less can still further prevent adhesion of the resin to the wall surface of the channel.

In the present embodiment, the flow rate of an ink supplied to inkjet head 101 can be determined as follows: removing ink supply channel 102 from the inkjet head; measuring the weight of the ink discharged from removed ink supply channel 102 per unit time; and dividing the measured value by the specific gravity of the ink. The specific gravity of the ink can be measured with, for example, a hydrometer (DMA 35 Basic, manufactured by Anton Paar GmbH).

Step of Ejecting Ink (Step S30)

In the present step, the water based ink is ejected from the nozzles of inkjet head 101.

The amount of the water based ink ejected from inkjet head 101 is appropriately set depending on the type of inkjet head 101, and is, for example, 1.5 to 9 pL.

In the present step, the water based ink ejected from the nozzles of inkjet head 101 may be applied onto the recording medium, or onto an intermediate transfer member.

The type of recording medium is not limited. The recording medium may be, for example, a highly water-absorbent recording medium made of paper, or a non-water absorbent recording medium such as a film or plastic board (made of, for example, soft vinyl chloride, hard vinyl chloride, or a polyolefin, or an acrylic board).

Drying Step (Step S40)

The image forming method according to the present embodiment may include a step of drying the water based ink applied on the recording medium (step S30).

A method for drying the water based ink is not limited, and for example, a known heater, infrared lamp, or the like can be used.

The temperature for drying the ink is preferably 60° C. or higher from the viewpoint of further improving fixability, and is preferably 180° C. or lower from the viewpoint of fixing with less energy.

Step of Discharging Water Based Ink from Inkjet Head (Step S50)

The image forming method according to the present embodiment may further include a step of discharging part of the water based ink from inkjet head 101—the part has not been ejected from the nozzles of inkjet head 101. In the present step, the ink not having been ejected from inkjet head 101 in step 20 is discharged from inkjet head 101.

In the present embodiment, liquid feed pump 103 can discharge the ink not having been ejected from inkjet head 101 to ink discharge channel 109. The discharged ink is returned to first tank 110 through ink discharge channel 109.

Step of Resupplying Ink to Inkjet Head (Step S60)

In the present embodiment, the method may further include a step of resupplying the part of the water based ink discharged from inkjet head 101 to the inkjet head. In the present step, the water based ink discharged from inkjet head 101 in step S50 is supplied to inkjet head 101 again.

In the present embodiment, liquid feed pump 103 can resupply the water based ink, which is discharged from inkjet head 101 and returned to first tank 110 in step S50, to inkjet head 101 through ink supply channel 102.

In the present step, a bypass channel connecting ink discharge channel 109 with ink supply channel 102 may be provided to resupply the discharged water based ink to inkjet head 101 through the bypass channel and ink supply channel 102.

Steps S40 and S50 are performed after step S10, and may be performed in parallel with step S20 and/or step S30.

The image forming method of the present embodiment can improve fixability while preventing pressure increase in a channel, which would be caused by increasing the flow rate of ink supplied to inkjet head 101.

EXAMPLES

The present invention will be specifically described below with reference to Examples, but the present invention is not limited thereto.

Preparation of Water Based Ink
Preparation of Pigment Dispersion Liquids 1 to 12

To 18.0 parts by mass of a cyan pigment (Pigment Blue 15:3, manufactured by Tokyo Chemical Industry Co., Ltd.), 13.5 parts by mass of pigment dispersant (DISPERBYK-190 (solid content of 40 mass %), manufactured by BYK Japan KK), 20.0 parts by mass of propylene glycol, and 48.5 parts by mass of ion-exchanged water were added and mixed. Thereafter, the cyan pigment was dispersed with a sand grinder filled with 50% by volume of zirconia beads having an average particle diameter of 0.5 mm to prepare pigment dispersion liquid 1 having the content of the cyan pigment of 18.0 mass %.

Pigment dispersion liquids 2 to 9 were prepared in the same manner except that the propylene glycol used in the preparation of pigment dispersion liquid 1 was changed to each solvent shown in Table 1. Pigment dispersion liquids 10 to 12 were prepared in the same manner, except that the cyan pigment used in the preparation of pigment dispersion liquid 2 was changed to each pigment shown in Table 1. Pigment Yellow 155 (manufactured by Tokyo Chemical Industry Co., Ltd.) was used as the yellow pigment, Pigment Red 122 (manufactured by Tokyo Chemical Industry Co., Ltd.) was used as the magenta pigment, and Carbon Black MA100 (manufactured by Mitsubishi Chemical Corporation) was used as the black pigment.

Preparation of Pigment Dispersion Liquid 13

A 12 L flask equipped with a mechanical stirrer, thermometer, nitrogen inlet, drying tube outlet, and addition funnel was charged with 3,750 g of tetrahydrofuran (THF) and 7.4 g of p-xylene. Tetrabutylammonium m-chlorobenzoate catalyst (3.0 ml of a 1.0 M solution dissolved in acetonitrile) was then added, followed by the addition of 291.1 g (1.25M) of an initiator, (1,1-bis(trimethylsiloxy)-2-methylpropene). Tetrabutylammonium m-chlorobenzoate catalyst was added into the flask over 150 minutes from the start of the addition.

Simultaneously with the addition of tetrabutylammonium m-chlorobenzoate catalyst, the addition of 1,976 g of trimethylsilyl methacrylate (12.5 M) into the flask was started and continued for 35 minutes. After the addition of trimethylsilyl methacrylate was completed, the mixture was subjected to polymerization reaction for 180 minutes, and more than 99% of the monomers were reacted.

Subsequently, 1,772 g of butyl methacrylate (12.5M) was added into the flask over 30 minutes. After 400 minutes of the polymerization reaction, 780 g of dry methanol was added into the flask and distillation was then started. Distillation was performed in two stages and the solvent with a boiling point below 55° C. was removed from the flask in the first stage. The solvent with a boiling point below 76° C. was removed from the flask in the second stage. During the second stage distillation, 5,100 g of isopropanol was added into the flask. A total of 8,007 g of all the solvents was removed in the two stages of distillation.

Through the above procedure, a solution of butyl methacrylate/methacrylic acid (BMA/MAA=10/10) AB block polymer (molecular weight 2,400 with 52.5% concentration) dissolved in THF and isopropanol was obtained. The weight-average molecular weight (Mw) of the AB block polymer was measured by gel permeation chromatography using polymethyl methacrylate as a reference standard.

A solution of AB block polymer at 20% concentration was obtained by neutralizing 19.05 g of the AB block polymer solution with 3.86 g of KOH solution at 45.6% concentration (solvent: 36.7 g of deionized water).

To 18 parts by mass of cyan pigment (Pigment Blue 15:3, manufactured by Tokyo Chemical Industry Co., Ltd.), 27 parts by mass of the AB block polymer solution (concentration 20%), 20 parts by mass of propylene glycol, and 35 parts by mass of ion-exchanged water were added and mixed. Thereafter, the cyan pigment was dispersed with a sand grinder filled with 50% by volume of zirconia beads having an average particle diameter of 0.5 mm to prepare pigment dispersion liquid 13 having the content of the cyan pigment of 18.0 mass %.

TABLE 1

| Pigment dispersion liquid No. | Pigment | Pigment dispersant | Solvent |
|---|---|---|---|
| 1 | Cyan | BYK190 | Propylene glycol |
| 2 | Cyan | BYK190 | 1,2-Hexanediol |
| 3 | Cyan | BYK190 | 1,2-Pentanediol |
| 4 | Cyan | BYK190 | Triethylene glycol monobutyl ether |
| 5 | Cyan | BYK190 | 1,2-Butanediol |
| 6 | Cyan | BYK190 | 1,3-Butanediol |
| 7 | Cyan | BYK190 | Diethylene glycol monobutyl ether |
| 8 | Cyan | BYK190 | Tripropylene glycol monomethyl ether |
| 9 | Cyan | BYK190 | Dipropylene glycol dimethyl ether |
| 10 | Yellow | BYK190 | 1,2-Hexanediol |
| 11 | Magenta | BYK190 | 1,2-Hexanediol |
| 12 | Black | BYK190 | 1,2-Hexanediol |
| 13 | Cyan | AB block | 1,2-Hexanediol |

Preparation of Water Based Ink

To 22.2 parts by mass of pigment dispersion liquid 1, the following components were added while pigment dispersion liquid 1 is stirred: 15.6 parts by mass of propylene glycol (PG) as an organic solvent, 15 parts by mass of a polyester resin (MD2000, (solid content concentration of 40% by mass and dispersion medium of water) manufactured by Toyobo Co., Ltd.) as a resin, and 1.0 part by mass of a surfactant (KF351A, manufactured by Shin-Etsu Chemical Co., Ltd.) were added. Ion-exchanged water is further added so that the total becomes 100 parts by mass to produce an ink composition. The above ink composition was filtered through a 0.8 μm filter to obtain water based ink 1.

For Experiments 1 to 50 described below (in Tables 4 to 7, Experiment is abbreviated as "Ex."), an ink to be used for each experiment was prepared by changing the type and amount of each pigment dispersion liquid (described simply as "liquid" in Tables 4 to 7), the type and amount of each organic solvent, and the type and amount of each resin so that the composition of each ink was adjusted as shown in Tables 4 to 7. Tables 2 and 3 show lists of the types of organic solvents and resins used in Experiments 1 to 50. In Tables 4 to 7, the values of resin concentration and pigment concentration represent solid content conversion values. In Tables 4 to 7, when two types of organic solvents are used, for example, "1,2-HD/PG", the solvent SP value represents the SP value of the entire mixed organic solvents. The solvent concentration "10/10" means that the amount of 1,2-HD added is 10 mass % based on the total mass of the ink, and the amount of PG added is 10 mass % based on the total mass of the ink.

TABLE 2

| Abbreviation | Full name | SP VALUE [(MPa)$^{1/2}$] |
|---|---|---|
| PG | Propylene glycol | 30.3 |
| 1,2-BD | 1,2-Butanediol | 27.8 |
| 1,3-BD | 1,3-Butanediol | 29.1 |
| 1,2-PD | 1,2-Pentanediol | 26.0 |
| 1,2-HD | 1,2-Hexanediol | 24.7 |
| DEGBE | Diethylene glycol monobutyl ether | 20.6 |
| TEGBE | Triethylene glycol monobutyl ether | 20.2 |
| TPGME | Tripropylene glycol monomethyl ether | 19.6 |
| DPGDME | Dipropylene glycol dimethyl ether | 18.3 |

TABLE 3

| Resin | Glass transition temperature Tg [° C.] | Resin SP value [(MPa)$^{1/2}$] |
|---|---|---|
| Acrylic resin (JE-1113, Solid content 42.5%, SEIKO PMC Corporation) | −24 | 18.1 |
| PVC acrylic emulsion (BE-7500, Solid content 30.0%, SEIKO PMC Corporation) | 38 | 19.5 |
| Acrylic latex resin (R5151, Solid content 36.8%, Asahi Kasei Corporation) | 43 | Not measured |
| (Meth) acrylic resin (Mowinyl 6899D, Solid content 46%, Japan Coating Resin Co. Ltd.) | 49 | Not measured |
| Acrylic modified polyester resin (PESRESIN A-645GH, Solid content 30%, Takamatsu Oil & Fat Co. Ltd.) | 55 | Not measured |
| Polyester resin (MD2000, Solid content 40%, Toyobo Co. Ltd.) | 67 | 22.7 |
| Acrylic resin (SE841A, Solid content 40%, Taisei Fine Chemical Co. Ltd.) | 75 | 17.1 |
| Poly(meth)acrylate resin (R5118, Solid content 38.1%, Asahi Kasei Corporation) | 80 | 20.4 |
| (Meth) acrylic resin (NeoCryl A-662, Solid content 40%, Kusumoto Chemicals, Ltd.) | 95 | Not measured |
| Acrylic resin (GRANDOLL PP-1000EF, Solid content 45%, DIC Corporation) | 104 | Not measured |
| Styrene-acrylic resin (RE-1075, Solid content 47%, SEIKO PMC Corporation) | 15 | Not measured |

2. Experiments

Experiments 1 to 4, 6 to 40, and 42 to 50)

A liquid tank (first tank) of an image forming apparatus having the same configuration as image forming apparatus 100 illustrated in FIG. 1 was filled with the ink to be used in each experiment. The ink was circulated in the ink channel by the control of a liquid feed pump in such a way that the flow rate of the ink flowing into the piezo inkjet head (KM1024aLHG-RC, (360 dpi and ejection amount of 27 pL), manufactured by Konica Minolta, Inc.) was adjusted to the value shown in Tables 4 to 7. As filter 105, 2300 MESH (passing particle reference value 5 μm, manufactured by Kodama Seisakusho Co., Ltd.) was used.

The flow rate was measured by removing a pipe (the ink flows through the pipe into the inkjet head) from the inkjet head, measuring the weight of the ink that has flowed out from the pipe within a predetermined time, and then dividing the measured value by the density of the ink. The density of the ink was measured with a hydrometer (DMA 35 Basic, manufactured by Anton Paar GmbH).

Experiments 5 and 41

In image forming apparatus 100, the ink discharge channel was removed from the inkjet head and the ink discharge port was covered with a lid. The liquid tank (first tank) of the image forming apparatus was filled with the ink to be used in each experiment. The output of the pump was adjusted in such a way that the flow rate of the ink flowing into the inkjet head was adjusted to the value shown in Tables 4 and 7, and part of the ink was sent to the inkjet head while another part of the ink was ejected from the inkjet head.

The flow rate was measured in the same manner as in Experiments 1 to 4, 6 to 40, and 42 to 50.

Experiments 26a and 26b

Experiment 26a was conducted in the same manner as Experiment 26, except that filter 105 in the ink supply channel was changed to 1200 MESH (manufactured by Kodama Seisakusho Co., Ltd.). Experiment 26b was conducted in the same manner as Experiment 26, except that 700 MESH (manufactured by Kodama Seisakusho Co., Ltd.) was used for the filter in inkjet head 101.

3. Evaluations

Pressure Increase Evaluation

In the image forming apparatus for each of Experiments 1 to 50, the value of pressure increase in a channel due to adhesion of the resin to the wall surface of the channel or the filter was calculated from the difference in pressure values of two pressure sensors 104 installed in ink supply channel 102. The pressure increase value was evaluated according to the following criteria, and numbers 3 to 6 were evaluated as qualified. In the following evaluation, whether 100 L (300 L) of ink has passed through the channel between the two pressure sensors was determined from the flow rate of the ink and the time during which the ink was passed.

1: The pressure increase value after passing 100 L of ink was 10 kPa or more
2: The pressure increase value after passing 100 L of ink was 7 kPa or more and less than 10 kPa
3: The pressure increase value after passing 100 L of ink was 5 kPa or more and less than 7 kPa
4: The pressure increase value after passing 100 L of ink was 3 kPa or more and less than 5 kPa
5: The pressure increase value after passing 100 L of ink was less than 3 kPa, and the pressure increase value after passing 300 L of ink was 3 kPa or more
6: The pressure increase value after passing 300 L of ink was less than 3 kPa Fixability A solid image was formed on coated paper (OK Top Coat, manufactured by Oji Paper Co., Ltd.) with the use of the image forming apparatus and the ink in each of Experiments 1 to 50, under the conditions of a printing width of 100 nm×100 nm and a resolution of 720 dpi×720 dpi. The solid image was dried at a temperature of 75° C. for 10 minutes. A cross-cut tape peeling test was performed on the formed solid image. The fixability of each image was evaluated according to the following criteria, and grades A to D were evaluated as qualified.

A: The area of a portion of the solid image peeled off by the tape is less than 1% of the area of the solid image
B: The area of a portion of the solid image peeled off by the tape is 1% or more and less than 3% of the area of the solid image
C: The area of a portion of the solid image peeled off by the tape is 3% or more and less than 5% of the area of the solid image
D: The area of a portion of the solid image peeled off by the tape is 5% or more and less than 10% of the area of the solid image
E The area of a portion of the solid image peeled off by the tape is 10% or more of the area of the solid image Viscosity Change Rate The viscosity change rate was obtained from the following viscosities measured with an E-type viscometer (TP-200E, from Toki Sangyo Co., Ltd): the viscosity of the ink before being put into first tank 110; and the viscosity of the ink remaining in first tank after 100 L of ink passes through a filter in the inkjet head at the flow rate in each experiment. At this time, ink was not supplied from second tank 111 to first tank 110 during the procedure of passing 100 L of the ink through the filter. Whether 100 L of ink has passed through the filter was determined from the flow rate of the ink and the time during which the ink is passed. The obtained viscosity change rate was evaluated according to the following criteria.

A: Viscosity change rate was 2% or less
B: Viscosity change rate was more than 2% and 5% or less
C: Viscosity change rate was 5% or more Tables 4 to 7 show all the evaluation results of the experiments. When the water based ink contains more than one organic solvent, the column "Resin-solvent SP value difference" in Tables 4 to 7 represents the minimum value of the differences between the SP value of the water-insoluble resin and the SP values of the more than one organic solvent in the entire organic solvent of the water based ink.

TABLE 4

| | | Composition of ink | | | | | | |
|---|---|---|---|---|---|---|---|---|
| Ex. No. | Liquid No. | Resin | Resin Tg [° C.] | Resin SP value [(MPa)$^{1/2}$] | Resin Conc. [wt %] | Solvent | Solvent SP value [(MPa)$^{1/2}$] | Solvent Conc. [wt %] |
| 1 | 1 | R5151 | 43 | Not measured | 6 | PG | 30.3 | 20 |
| 2 | 1 | | | | | | | |
| 3 | 1 | | | | | | | |
| 4 | 1 | | | | | | | |
| 5 | 1 | | | | | | | |
| 6 | 1 | Mowinyl 6899D | 49 | Not measured | 6 | PG | 30.3 | 20 |
| 7 | 1 | PESRESIN A-645GH | 55 | Not measured | 6 | PG | 30.3 | 20 |
| 8 | 1 | MD2000 | 67 | 22.7 | 6 | PG | 30.3 | 20 |
| 9 | 1 | SE841A | 75 | 17.1 | 6 | PG | 30.3 | 20 |
| 10 | 1 | | | | | | | |
| 11 | 1 | R5118 | 80 | 20.4 | 6 | PG | 30.3 | 20 |
| 12 | 1 | NeoCryl A-662 | 95 | Not measured | 6 | PG | 30.3 | 20 |

| | Composition of ink | | | | Evaluation | | |
|---|---|---|---|---|---|---|---|
| Ex. No. | Resin-Solvent SP value difference [(MPa)$^{1/2}$] | Pigment Conc. [wt %] | Pigment/Resin | Presence of recirculating path | Flow rate [mL/min] | Pressure increase | Fixability | Viscosity change |
| 1 | — | 4 | 0.67 | Yes | 20 | 5 | C | B |
| 2 | — | | | Yes | 7 | 5 | C | B |
| 3 | — | | | Yes | 120 | 3 | C | B |
| 4 | — | | | Yes | 90 | 4 | C | B |
| 5 | — | | | No | 6 | 5 | C | — |
| 6 | — | 4 | 0.67 | Yes | 20 | 5 | C | B |
| 7 | — | 4 | 0.67 | Yes | 20 | 5 | C | B |
| 8 | 7.6 | 4 | 0.67 | Yes | 20 | 6 | D | A |
| 9 | 13.2 | 4 | 0.67 | Yes | 20 | 6 | D | A |
| 10 | — | | | Yes | 70 | 6 | D | A |
| 11 | 9.9 | 4 | 0.67 | Yes | 20 | 6 | D | A |
| 12 | — | 4 | 0.67 | Yes | 20 | 6 | D | A |

TABLE 5

| | | Composition of ink | | | | | | |
|---|---|---|---|---|---|---|---|---|
| Ex. No. | Liquid No. | Resin | Resin Tg [° C.] | Resin SP value [(MPa)$^{1/2}$] | Resin Conc. [wt %] | Solvent | Solvent SP value [(MPa)$^{1/2}$] | Solvent Conc. [wt %] |
| 13 | 2 | MD2000 | 67 | 22.7 | 6 | 1,2-HD | 24.7 | 20 |
| 14 | 1 | | | | | 1,2-HD/PG | 27.4 | 10/10 |
| 15 | 1 | | | | | 1,2-HD/PG | 30.2 | 0.5/19.5 |
| 16 | 1 | | | | | 1,2-HD/PG | 29.7 | 2/18 |
| 17 | 3 | | | | | 1,2-PD | 26.0 | 20 |
| 18 | 4 | | | | | TEGBE | 20.2 | 15 |
| 19 | 2 | SE841A | 75 | 17.1 | 6 | 1,2-HD | 24.7 | 20 |
| 20 | 1 | | | | | 1,2-HD/PG | 27.4 | 10/10 |
| 21 | 3 | | | | | 1,2-PD | 26.0 | 20 |
| 22 | 5 | | | | | 1,2-BD | 27.8 | 20 |
| 23 | 6 | | | | | 1,3-BD | 29.1 | 20 |

TABLE 5-continued

| Ex. No. | | | | | | Solvent | Solvent SP value [(MPa)$^{1/2}$] | Solvent Conc. [wt %] |
|---|---|---|---|---|---|---|---|---|
| 24 | 7 | | | | | DEGBE/PG | 25.3 | 10/10 |
| 25 | 2 | R5118 | 80 | 20.4 | 6 | 1,2-HD | 24.7 | 35 |
| 26 | 8 | | | | | TPGME | 19.6 | 45 |
| 26a | 8 | | | | | | | |
| 26b | 8 | | | | | | | |
| 27 | 8 | | | | | TPGME | 19.6 | 35 |
| 28 | 9 | | | | | DPGDME | 18.3 | 35 |

| | Composition of ink | | | | | | |
|---|---|---|---|---|---|---|---|
| | Resin-Solvent SP value | Pigment | | Presence of | | Evaluation | |
| Ex. No. | difference [(MPa)$^{1/2}$] | Conc. [wt %] | Pigment/ Resin | recirculating path | Flow rate [mL/min] | Pressure increase | Fixability | Viscosity change |
| 13 | 2.0 | 4 | 0.67 | Yes | 20 | 6 | A | A |
| 14 | 4.7 | | | | | 6 | B | A |
| 15 | 7.5 | | | | | 6 | C | A |
| 16 | 7.0 | | | | | 6 | B | A |
| 17 | 3.3 | | | | | 6 | A | A |
| 18 | 2.5 | | | | | 6 | A | A |
| 19 | 7.6 | 4 | 0.67 | Yes | 20 | 6 | A | A |
| 20 | 10.3 | | | | | 6 | C | A |
| 21 | 8.9 | | | | | 6 | C | A |
| 22 | 10.7 | | | | | 6 | C | A |
| 23 | 12.0 | | | | | 6 | D | A |
| 24 | 8.2 | | | | | 6 | C | A |
| 25 | 4.3 | 4 | 0.67 | Yes | 20 | 6 | A | A |
| 26 | 0.8 | | | | | 4 | A | B |
| 26a | | | | | | 5 | A | B |
| 26b | | | | | | 6 | A | B |
| 27 | 0.8 | | | | | 5 | A | B |
| 28 | 2.1 | | | | | 6 | A | A |

TABLE 6

| | Composition of ink | | | | | | | |
|---|---|---|---|---|---|---|---|---|
| Ex. No. | Liquid No. | Resin | Resin Tg [° C.] | Resin SP value [(MPa)$^{1/2}$] | Resin Conc. [wt %] | Solvent | Solvent SP value [(MPa)$^{1/2}$] | Solvent Conc. [wt %] |
| 29 | 2 | MD2000 | 67 | 22.7 | 6 | 1,2-HD | 24.7 | 20 |
| 30 | 2 | | | | 6 | 1,2-HD | 24.7 | 20 |
| 31 | 2 | | | | 10 | 1,2-HD | 24.7 | 20 |
| 32 | 1,2 | | | | 6 | 1,2-HD/PG | 27.4 | 10/10 |
| 33 | 1,2 | | | | 8 | 1,2-HD/PG | 27.4 | 10/10 |
| 34 | 1 | SE841A | 75 | 17.1 | 6 | 1,2-HD/PG | 27.4 | 10/10 |
| 35 | 1,2 | | | | 6 | 1,2-HD/PG | 27.4 | 10/10 |
| 36 | 10 | MD2000 | 67 | 22.7 | 6 | 1,2-HD | 24.7 | 20 |
| 37 | 11 | | | | | | | |
| 38 | 12 | | | | | | | |
| 39 | 13 | | | | | | | |

| | Composition of ink | | | | | | |
|---|---|---|---|---|---|---|---|
| | Resin-Solvent SP value | Pigment | | Presence of | | Evaluation | |
| Ex. No. | difference [(MPa)$^{1/2}$] | Conc. [wt %] | Pigment / Resin | recirculating path | Flow rate [mL/min] | Pressure increase | Fixability | Viscosity change |
| 29 | 2.0 | 7 | 1.17 | Yes | 20 | 6 | A | A |
| 30 | 2.0 | 10 | 1.67 | | | 6 | B | A |
| 31 | 2.0 | 10 | 1.00 | | | 6 | A | A |
| 32 | 4.7 | 10 | 1.67 | | | 6 | C | A |
| 33 | 4.7 | 12 | 1.50 | | | 6 | B | A |
| 34 | 4.9 | 7 | 1.17 | Yes | 20 | 6 | B | A |
| 35 | 4.9 | 10 | 1.67 | | | 6 | C | A |

TABLE 6-continued

| | | | | | | | | | |
|---|---|---|---|---|---|---|---|---|---|
| 36 | 2.0 | 6 | 0.67 | Yes | 20 | 6 | | A | A |
| 37 | | | | | | 6 | | A | A |
| 38 | | | | | | 6 | | A | A |
| 39 | | | | | | 6 | | A | A |

TABLE 7

Composition of ink

| Ex. No. | Liquid No. | Resin | Resin Tg [° C.] | Resin SP value [(MPa)$^{1/2}$] | Resin Conc. [wt %] | Solvent | Solvent SP value [(MPa)$^{1/2}$] | Solvent Conc. [wt %] |
|---|---|---|---|---|---|---|---|---|
| 40 | 1 | JE-1113 | −24 | 18.1 | 6 | PG | 30.3 | 20 |
| 41 | 1 | | | | | | | |
| 42 | 1 | | | | | | | |
| 43 | 1 | BE-7500 | 38 | 19.5 | 6 | PG | 30.3 | 20 |
| 14 | 1 | | | | | | | |
| 45 | 1 | | | | | | | |
| 46 | 1 | | | | | | | |
| 47 | 2 | | | | | 1,2-HD | 24.7 | 20 |
| 48 | 1 | PP-1000EF | 104 | Not measured | 6 | PG | 30.3 | 20 |
| 49 | 2 | RE-1075 | 15 | Not measured | 6 | 1,2-HD | 24.7 | 20 |
| 50 | 2 | | | | | | | |

Composition of ink / Evaluation

| Ex. No. | Resin-Solvent SP value difference [(MPa)$^{1/2}$] | Pigment Conc. [wt %] | Pigment / Resin | Presence of recirculating path | Flow rate [mL/min] | Pressure increase | Fixability | Viscosity change |
|---|---|---|---|---|---|---|---|---|
| 40 | 12.2 | 4 | 0.67 | Yes | 20 | 1 | D | C |
| 41 | | | | No | 6 | 2 | D | C |
| 42 | | | | Yes | 150 | 1 | E | C |
| 43 | 10.8 | 4 | 0.67 | Yes | 20 | 2 | D | C |
| 14 | | | | | 7 | 2 | D | C |
| 45 | | | | | 120 | 1 | E | C |
| 46 | | | | | 4 | 3 | C | B |
| 47 | 5.2 | 4 | 0.67 | Yes | 20 | 1 | D | C |
| 48 | — | 4 | 0.67 | Yes | 20 | 5 | E | C |
| 49 | — | 10 | 1.67 | Yes | 3 | 3 | B | B |
| 50 | | 4 | 0.67 | | 3 | 3 | A | B |

Ejection Stability

For each of Experiments 26, 26a, and 26b, one day after a pattern image was formed, another pattern image that enables confirmation whether the ink was ejected from each of the 1024 nozzles was printed by ejecting the ink from inkjet head 101 to evaluate ejection stability according to the following criteria. Table 8 shows the evaluation results. Nozzle failure less than 0.3% means that the number of failing nozzles is 1 or more and 3 or less out of 1024 nozzles, nozzle failure 0.3% or more and less than 0.5% means that the number of failing nozzles is 4 or 5 out of 1024 nozzles, and nozzle failure 0.5% or more means that the number of failing nozzles is 5 or more out of 1024 nozzles. The grade C or higher was evaluated as qualified.

A: No nozzle failure was observed
B: Nozzle failure was observed, but less than 0.3%
C: Nozzle failure was observed, but 0.3% or more and less than 0.5%
D: Nozzle failure of 0.5% or more was observed

TABLE 8

| Experiment No. | Ejection stability |
|---|---|
| 26 | A |
| 26a | B |
| 26b | C |

Experiments 1 to 39 gave better results than Experiments 40 to 50 in the evaluations of pressure increase and fixability. The reason for the above results can be considered as follows. As the glass transition temperature of the resin contained in the ink was 40° C. or higher, the softening of a resin was prevented, and thus the resin was less likely to adhere to the wall surface of a channel or a filter even with the ink flow rate of 5 mL/min or more (the softening of a resin may be caused by frictional heat generated in the channel and shearing heat during the passing of ink through the filter when the ink flow rate is increased). As the glass transition temperature was 100° C. or less, it is considered that fixation was facilitated at a lower temperature, thereby improving the fixability.

Experiments 1 to 7, in which the water-insoluble resin had a glass transition temperature of 65° C. or less, gave better results in fixability than Experiments 8 to 12. The reason for the above results can be considered as follows: due to the decrease in the glass transition temperature, the resin became easier to soften, thereby facilitating the formation of a coating film. On the other hand, Experiments 8 to 12, in which the glass transition temperatures are higher than in Experiments 1 to 7, gave better evaluations in the pressure increase than Experiments 1 to 7. The reason for the above results can be considered as follows: the softening of the resin, which is caused by frictional heat generated in the channel and shearing heat during the passing of ink through the filter, was further prevented; thus the resin is less likely to adhere to the wall surface of the channel or the filter. It is conceivable that the pressure increase in Experiments 13 to 25, 26b, and 28 to 39 was prevented for the same reason.

Experiments 13 to 39, in which the inks contain organic solvents having the SP value of 16 $(MPa)^{1/2}$ or more and 28 $(MPa)^{1/2}$ or less, gave better evaluations in fixability than Experiments 8 to 11, in which the same types of water-insoluble resin are contained. The reason for the above results can be considered as follows. The organic solvent has high compatibility with the resin. After the ink containing such an organic solvent was deposited on the recording medium, the proportion of the organic solvent in the ink increased as the water evaporates. On this occasion, the resin contained in the ink and the organic solvent were more likely to become partially compatible. Appropriate softening of the surface of the resin particles facilitated fusion in the resin, thereby allowing the resin to form a film on the recording medium and improving fixability. The results of Experiments 13 to 18, 43, and 47 show that fixability was remarkably improved by using the above organic solvent together with a water-insoluble resin having a glass transition temperature of 40° C. or higher and 100° C. or lower. It can be considered that the use of the resin, which has a high glass transition temperature thus requires a certain amount of heat for film formation, unsurprisingly boosts the effect of promoting the film formation of the organic solvent.

In Experiments 13 to 24, the fixability improved as the difference between the SP value of the water-insoluble resin and the SP value of the organic solvent decreased. The reason for the above results can be considered as follows: after the ink was deposited on the recording medium, the SP value of the ink approaches the SP value of the organic solvent and also the SP value of the resin during the water evaporation; thus the surface of the resin particles can be appropriately dissolved to facilitate the film formation from the resin. Experiments 26, 27, and 28 show that the pressure increase evaluation became better when the difference in SP value was 2 $(MPa)^{1/2}$ or more. The reason for the above results can be considered as follows: adhesion of the water-insoluble resin to the wall surface of the channel or to a filter, which may be caused by excessive dissolution of the surface of the resin before the ink was deposited on the recording medium, can be further prevented.

The results of Experiments 29 to 35 show that the fixability was improved when the ratio (PB ratio) of the pigment content to the resin content was 0.5 or more and 1.5 or less. The reason for the above results can be considered as follows: as the ink contains the resin at an appropriate amount that is required for fixing the pigment with respect to the amount of pigment, the fixability had improved. The results of Experiments 49 and 50 show that the fixability was remarkably improved by using a water-insoluble resin having a glass transition temperature of 40° C. or higher and 100° C. or lower and adjusting the PB ratio to the above range. It can be considered that the use of the resin, which has a high glass transition temperature thus requires a certain amount of heat for film formation, unsurprisingly boosts the effect of improving the fixability by adjusting the PB ratio.

The image forming method of the present invention can prevent the increase in the pressure in a channel through which ink passes and also improve the fixability of an image even when the flow rate of the ink supplied to an inkjet head is increased. Therefore, the present invention is particularly advantageous, for example, for an image forming method in which a recirculating path is used or an image forming method in which connected ink jet heads are used.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image forming method, comprising:
   supplying a water based ink to an inkjet head at a flow rate of 5 mL/min or more and 120 mL/min or less; and
   ejecting, from a nozzle of the inkjet head, the water based ink supplied in the supplying,
   wherein
   the water based ink contains a colorant and a water-insoluble resin having a glass transition temperature of 40° C. or higher and 100° C. or lower.

2. The image forming method according to claim 1, further comprising:
   discharging part of the water based ink from the inkjet head, the part not having been ejected from the nozzle; and
   resupplying, to the inkjet head, the part of the water based ink discharged in the discharging.

3. The image forming method according to claim 1, further comprising:
   passing the water based ink through a filter, wherein a mesh number of the filter is 80×700 or more.

4. The image forming method according to claim 3, wherein
   the mesh number of the filter is 150×1200 or more.

5. The image forming method according to claim 1, wherein
   the water based ink has a viscosity change rate of 5% or less between before and after passing 100 L of the water based ink at a flow rate of 20 mL/min through a twill weave stainless steel filter with a mesh number of 325×2300, a vertical wire diameter of 35 μm, and a horizontal wire diameter of 25 μm.

6. The image forming method according to claim 1, wherein
   the water based ink contains a water-soluble organic solvent having an SP value of 16 $(MPa)^{1/2}$ or more and 28 $(MPa)^{1/2}$ or less.

7. The image forming method according to claim 6, wherein
   the SP value of the water-soluble organic solvent is 18 $(MPa)^{1/2}$ or more and 26 $(MPa)^{1/2}$ or less.

8. The image forming method according to claim 6, wherein
   a content of the water-soluble organic solvent is 1 mass % or more and 40 mass % or less based on a total mass of the water based ink.

9. The image forming method according to claim 6, wherein a minimum value of a difference between an SP value of the water-insoluble resin and the SP value of the water-soluble organic solvent is 2 $(MPa)^{1/2}$ or more and 11 $(MPa)^{1/2}$ or less.

10. The image forming method according to claim 6, wherein an entire organic solvent contained in the water based ink has an SP value of 16 $(MPa)^{1/2}$ or more and 30 $(MPa)^{1/2}$ or less.

11. The image forming method according to claim 6, wherein a minimum value of a difference between an SP value of an entire organic solvent contained in the water based ink and an SP value of the water-insoluble resin is 2 $(MPa)^{1/2}$ or more and 11 $(MPa)^{1/2}$ or less.

12. The image forming method according to claim 1, wherein the glass transition temperature of the water-insoluble resin is 60° C. or higher and 90° C. or lower.

13. The image forming method according to claim 1, wherein a content of the water-insoluble resin is 1 mass % or more and 10 mass % or less based on a total mass of the water based ink.

14. The image forming method according to claim 1, wherein a content of the colorant is 4 mass % or more and 15 mass % or less based on a total mass of the water based ink.

* * * * *